United States Patent [19]

Mazziotti

[11] Patent Number: 4,960,334
[45] Date of Patent: Oct. 2, 1990

[54] SUPPORT FOR ROTATABLY SUPPORTING A SHAFT

[75] Inventor: Philip J. Mazziotti, Toledo, Ohio

[73] Assignee: The Zeller Corporation, Defiance, Ohio

[21] Appl. No.: 318,017

[22] Filed: Mar. 2, 1989

[51] Int. Cl.$^5$ .................. F16C 33/76; F16C 27/06; F16C 33/38
[52] U.S. Cl. .................. 384/486; 384/478; 384/523; 384/536
[58] Field of Search ............. 384/530, 536, 582, 470, 384/482, 484, 486, 477, 478, 523–534

[56] References Cited

U.S. PATENT DOCUMENTS

| | | | |
|---|---|---|---|
| 649,802 | 5/1900 | Brewer | 384/524 |
| 2,067,464 | 1/1937 | Smith | 384/484 |
| 2,897,023 | 7/1959 | Burkhalter et al. | 384/536 |
| 3,113,812 | 12/1963 | Dotter | 384/484 |
| 3,146,039 | 8/1964 | Dunn | 384/532 |
| 3,554,621 | 1/1971 | McAllister | 384/484 |
| 3,788,714 | 1/1974 | Degioia et al. | 384/482 |
| 4,364,613 | 12/1982 | Mangiavacchi | 384/536 |
| 4,664,538 | 5/1987 | Galbato | 384/486 X |
| 4,865,470 | 9/1989 | Mazziotti | 384/478 |

FOREIGN PATENT DOCUMENTS 1104870 11/1955 France .................. 384/530

Primary Examiner—Thomas R. Hannon
Attorney, Agent, or Firm—Allen D. Gutchess, Jr.

[57] ABSTRACT

A support for rotatbly supporting a portion of a shaft, specifically a drive shaft of a vehicle, is disclosed. An intermediate drive shaft support is required when three or more universal joints are embodied in a drive line between a transmission and a differential of the vehicle. An intermediate drive shaft is sufficiently long that it tends to bend or whip to an objectionable extent. The shaft support features a simplified, lower-cost bearing having fewer rolling elements in the form of balls or rollers between inner and outer races, there being from three to six and preferably four. Two rings are located on the sides of the rolling elements to uniformly circumferentially space the elements and can also provide lubricant seals. Each of the rings has a plurality of uniformly-circumferentially spaced recesses in which portions of the rolling elements are received. Each of the rings can have annular sealing lips which engage the inner and outer races and can also have annular ridge which engages a flinger located adjacent the inner race, to hold the ring in place. The races, rolling elements, and spacing and sealing rings can be made of lower cost materials which are also easier to manufacture.

25 Claims, 2 Drawing Sheets

SUPPORT FOR ROTATABLY SUPPORTING A SHAFT

This invention relates to a drive line support employing a bearing which is low in cost and simplified in design.

Intermediate supports for drive shafts have traditionally employed conventional, commercially-available anti-friction bearings, because they have been reasonably low priced and readily available. Such bearings were basically produced to be load-carrying and anti-friction supports. However, intermediate supports for drive shafts carry relatively light loads and do not require the load-carrying capacity of the commercially-available bearings.

The intermediate shaft support in accordance with the invention features a low-cost, simplified rolling contact support or bearing which meets all of the requirements for the particular application. The bearing includes inner and outer races which can be made of lower cost materials and/or materials which are easier to form. These include relatively soft steel, powered metal, plastic materials, and ceramic materials. The rolling elements in the form of balls or rollers can be made of similar, compatable materials. The bearing also employs fewer rolling elements, from three to six, and usually four. The bearing can use conventional bearing seals and may also have a combination cage and lubricant retainer comprising two symmetrical rings, one of which is located on each side of the rolling elements. The rings are preferably made of plastic or elastomeric material which is somewhat resilient. Each of the rings has a number of recesses equal to the number of the rolling elements, with substantially half of the rolling elements being received in the recesses in each of the rings. The rings thus serve as a cage to hold the elements in uniformly-spaced relationship around the races. Each of the rings also has a first sealing lip or ridge contacting the inner race and a second sealing lip or ridge contacting the outer race to serve as a lubricant seal on each side of the rolline elements. Each of the rings also has a third annular ridge or projections extending away from the inner grove. These third ridges or projections engage flingers located on each side of the inner race to maintain the combination cage and sealing rings in position relative to the rolling elements and the inner and outer races. If the flingers are not used, the third ridges need not be employed. The two rings could then be held in some other manner, as by interlocking grooves or adhesive or by attaching the two rings to each other.

It is, therefore, a prinicpal object of the invention to provide a support for rotatably supporting a portion of a shaft, which support employs a lower-cost, simplified bearing.

Another object of the invention is to provide a bearing which is of lower-cost and simplified design for applications encountering light loads.

A further object of the invention is to provide a combination cage and lubricant retainer which substantially reduces the relative velocity between between the sealing lips and the inner and outer races compared to conventional seals which have the seal lip structure attached to the outer race and have a sliding contact with the inner race.

Many other objects and advantages of the invention will be apparent from the following detailed desctiption of preferred embodiments thereof, reference being made to the accompanying drawings, in which, FIG. 1 is a schematic view in elevation of a drive line of a vehicle with which a shaft support embodying the invention is used:

Figure 1:
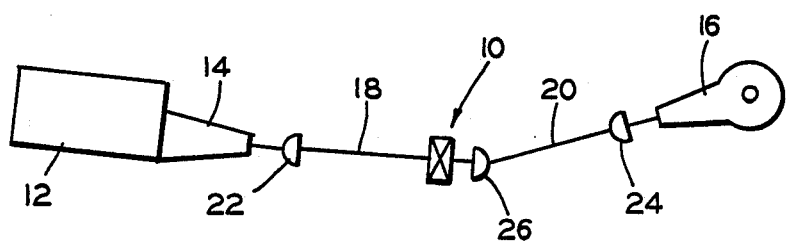

Referring to FIG. 1, a drive shaft support 10 is shown in a typical application. Here, a vehicle engine 12 with a transmission 14 is connected to a rear axle differential 16 by front and rear drive shafts 18 and 20. A front universal joint 22 connects the shaft 18 with the transmission 14 and a rear universal joint 24 connects the rear drive shaft 20 with the differential 16. The shafts 18 and 20 are connected by an intermediate universal joint 26. The drive shaft support 10 specifically supports the rear portion of the front drive shaft 18 near the intermediate universal joint 26.

Figure 2:
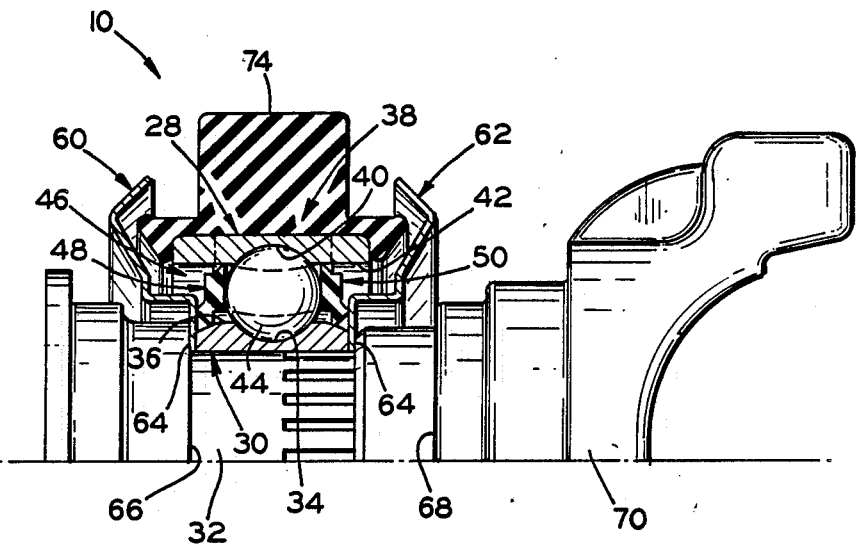
FIG. 2 is an enlarges view in transverse cross section of one-half of the shaft support of FIG. 1, with a portion of the drive shaft shown in elevation.
Figure 3:
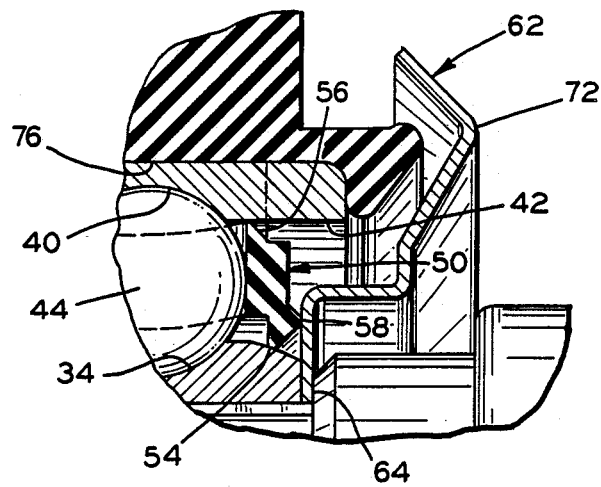
FIG. 3 is a further enlarged, fragmentary view of a portion of the shaft support of FIG. 2.
Figures 4, 5:
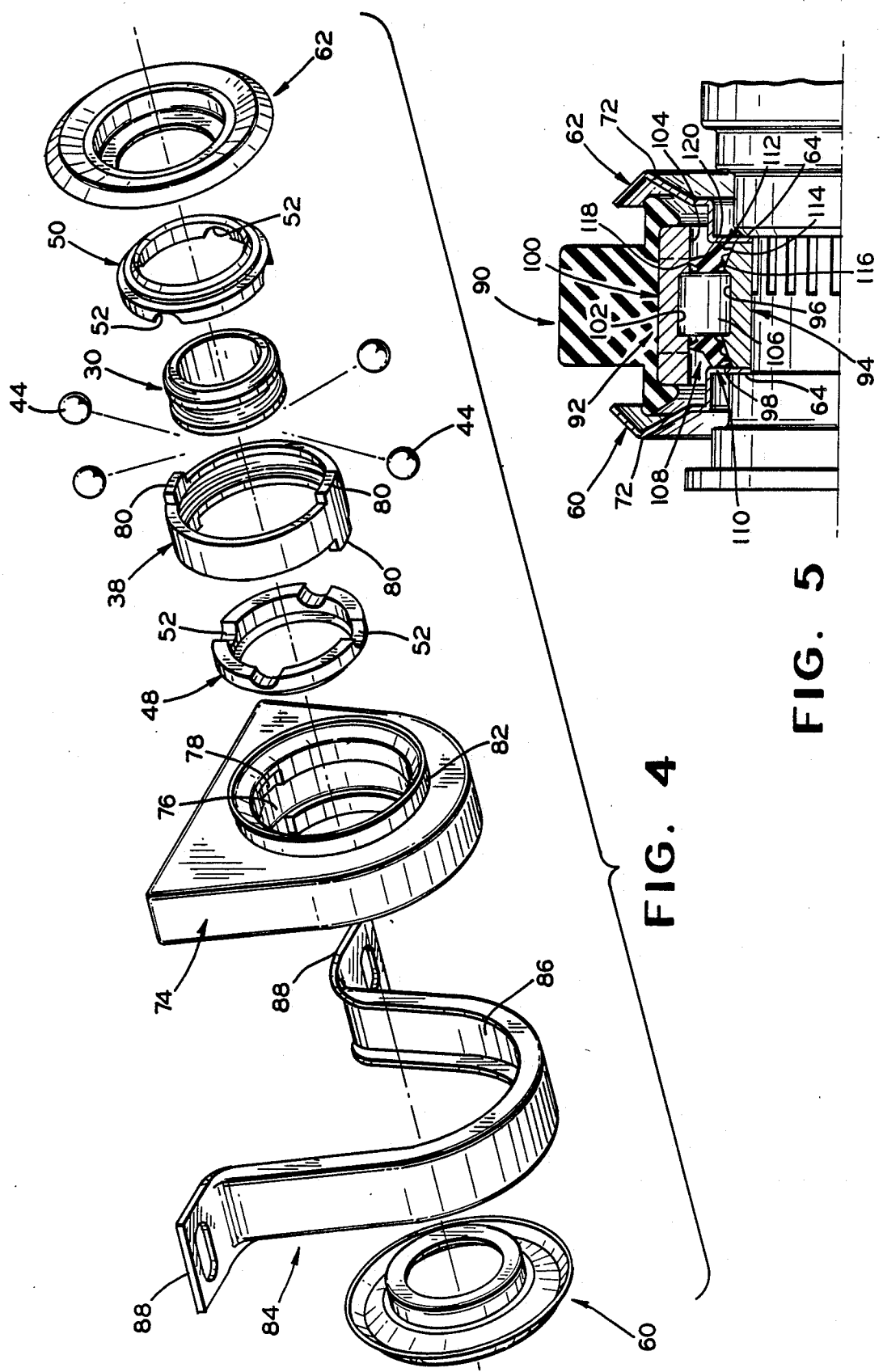
FIG. 4 is an exploded view in perspective of the shaft support of FIG. 2.
FIG. 5 is a view similar to FIG. 2 of a slightly modified shaft support.

Referring to FIGS. 2-4 the shaft support 10 includes a rolling contact support or bearing 28 in accordance with the invention. The bearing includes an inner race 30 which is mounted with a press-fit on a stub shaft 32 forming an end portion of the drive shaft 18. The inner race 30 has an outwardly-facing annular groove 34 at an intermediate portion of an arcuate outer surface 36 thereof. An outer race 38 surrounds the inner race 30 and has an inwardly-facing annular groove 40 at an intermediate portion of an inner surface 42 thereof.

Rolling elements 44, in the form of balls in this instance, are received in the grooves 34 and 40 of the inner and outer races 30 and 38. With lighter loads involved, only three to six of the elements 44 are employed, preferably four. This aids in reducing the overall cost of the bearing 28. Further, the races 30 and 38 and the elements 44 can be made of lower cost, more easily-formed materials. These materials include relatively soft steel and also powdered metal which can be formed or shaped under heat and pressure at less cost than conventional machining or other manufacturing techniques, in some instances. The material of which these components are made can also encompass certain plastics and ceramics.

The bearing 28 in accordance with the invention also can employ a low-cost combination cage and lubricant-sealing element indicated at 46. The element is made of two rings 48 and 50 which are preferably symmetrical to further reduce manufacturing costs. Each of the rings 48 and 50 has a plurality of uniformaly-circumferentially space recesses 52, the number of which are equal to the number of the rolling elements or balls 44. The recesses are shaped similarly to one-half of the elements 44 so that the elements are surrounded by the aligned recesses 52 when the rings 48 and 50 are placed together after the elements 44 are assembled with the inner and outer races 30 and 38.

Each of the rings 48 and 50 has a first annular sealing lip or ridge 54 which contacts the outer surface 36 of the inner race 30 on one side of the groove 34. Each of the rings 48 and 50 also has a second annular sealing lip or ridge 56 which contacts the inner surface 42 of the outer race 38 on one side of the groove 40. Further, each of the rings 48 and 50 can have an annular ridge or projections 58 extending away from the groove 34 of the inner race 30. The ridge or projections 58 extend to or slightly beyond the corresponding annular edge of the inner race 30 and serve to hold the corresponding ring 48 or 50 in position relative to the rolling elements 44, the inner race 30, and the outer race 38. The projections 58 may be replaced with an alternative such as by attaching elements 48 and 50 together by such known mechanisms as interlocking grooves or adhesives. The projections 58 need not be continuous but if they are, in the form of a ridge, they tend to form an additional seal with the sealing lip 54. The rings 48 and 50 preferably are made of a somewhat resilient plastic or elastomeric materials that the lips 54 and 56 can provide the sealing function to retain lubricant around the rolling elements 44. For example, the rings 48 and 50 can be made of a wide-range of oil resistant, thermoplastics and elastomers, such as "Nylatron".

The shaft support 10 can include outer bearing shields or flingers 60 and 62 which provide additional protection for the bearing 28 from dust, dirt, and water. The shields are also preferably symmetrical to reduce die costs, inventory, and the chance for assembly errors. Each of the shields includes a radially-extending mounting flange 64 having a circular opening with a diameter substantially equal to the inner diameter of the inner race 30. The shields and specifically the flanges 64 are mounted on this shaft in contiguous relationship with the annular edges of the inner race 30. In this instance, the shield 60 is mounted on the stub shaft 32 between the inner race 30 and a shoulder 66, and the outer mounting flange is located between the inner race 30 and an end 68 of a yoke 70 forming part of the universal joint 26. Other means can also be employed to mount the shields 60 and 62 adjacent the bearing 28, such as a retaining collar which is press fit on the shaft adjacent one of the shields 60 and 62. Extending out from the mounting flanges 64 of the shields 60 and 62 are protective flanges 72 which extend generally radially-outwardly away from the stub shaft 32 well beyond the outer race 38 of the bearing 28.

The shaft support 10 usually includes a resilient molded rubber cushion block 74 which surrounds the bearing 28 and isolates the bearing and the shaft from the vehicle frame. The cushion block has a central opening with an annular recess 76 which receives the outer race 38. The cushion block also has diametrically-opposite recesses 78 on each side of the annular recess 76. These receive tabs 80 which are of similar size and shape and extend outwardly from the outer race 38. The recesses and tabs prevent the bearing 28 from rotating relative to the cushion block 74. If desired, the recesses can be on the outer race 38 and tabs can be molded in the cushion block 74. The cushion block 74 also has annular, outwardly-extending flanges 82 to cooperate with the flingers 60 and 62 to provide additional protection from dirt and dust for the bearing 28. For those few applications where a resilient molded rubber cushion block is not used, outer race 38 would be directly attached to the supporting structure.

A bracket or hanger 84 (FIG. 4) is of U-shaped configuration and has a groove 86 to receive the periphery of the cushion block 74. The bracket also has mounting flanges 88 by means of which the hanger and the support 10 can be adjustably mounted relative to a vehicle frame.

The fingers, cushion block, and bracket are shown and disclosed more fully in my co-pending patent application Ser. No. 261,618, filed Oct. 24, 1988, and will not be discussed in further detail.

A slightly modified shaft support 90 is shown in FIG. 5. A rolling contact support or bearing 92 has an inner race 94 with an outwardly-facing annular groove 96 of rectangular shape in transverse cross section formed in a portion of an outer surface 98. An outer race 100 has an inwardly-facing annular groove 102 of rectangular shape in transverse cross section formed in a portion of an inner surface 104. In this instance, rolling elements in the form of rollers 106 are received in the grooves 96 and 102. Three of four of the elements 106 are employed, these few being sufficient for the light loads involved. However, more elements can be used to reduce noise and to enable larger tolerances to be employed in the manufacture of the components.

A modified cage and sealing element 108 is employed in the bearing 92. The element 108 also includes two rings 110 and 112 which are symmetrical with circumferentially-spaced recesses to receive the rollers 106. However, in this instance, each of the rings 110 and 112 has two annular sealing lips or ridges 114 and 116 which contact the outer surface 98 of the inner race 94. Each of the rings also has third annular sealing lips or ridges 118 to contact the inner surface 104 of the outer race 100. These provide somewhat more effective seals for the lubricant. The rings 110 and 112 also can have outer ridges or projections 102 which engage the flingers 60 and 62 or alternatives, similarly to the embodiment of FIG. 2. If desired, each of the rings 110 and 112 can be in two parts, one with the recesses to receive and space the rollers 106 and one with the lips to provide the seals.

Various modifications of the above-described embodiments of the invention will be apparent to those skilled in the art and it is to be understood that such modifications can be made without departing from the scope of the invention, if they are within the spirit and the tenor of the accompanying claims.

I claim:

1. A low-cost, simplified rolling contact support for use with a shaft support for supporting a portion of a shaft, said rolling contact support having an inner race to be mounted on the shaft, said race having an outwardly-facing annular groove at an intermediate portion of an outer surface thereof, said outer surface being arcuate shape as viewed in transverse cross section, an outer race having an inwardly-facing annular groove at an intermediate portion of an inner surface thereof, a plurality of rolling elements extending into said grooves, a combination cage and lubricant sealing element comprising two symmetrical spacing and sealing rings, one on each side of said rolling elements, each of said rings having a plurality of uniformly-circumferentially spaced recesses in which portions of said rolling elements are received, there being a number of recesses in each of said rings equal to the number of rolling elements, each of said rings having a first annular sealing lip contacting the arcuate outer surface of said inner race outside of said outwardly-facing groove, each of said rings having a second annular sealing lip contacting the inner surface of said outer race outside of said inwardly-facing groove, each of said rings having an additional annular sealing lip contacting the outer surface of said inner race outside of said first annular sealing lip, and resilient means extending around and supporting said outer race.

2. A shaft support according to claim 1 characterized by said inner and outer races being made of relatively soft, work-hardenable steel.

3. A low-cost, simplified rolling contact support for use with a shaft suppot for supporting a portion of a shaft, said rolling contact support having an inner race to be mounted on the shaft, said race having an outwardly-facing annular groove at an intermediate portion of an outer surface thereof, said outer surface being of arcuate shape as viewed in transverse cross section, an outer race having an inwardly-facing annular groove at an intermediate portion of an inner surface thereof, a plurality of rolling elements extending into said grooves, a combination cage and lubricant sealing element comprising two symmetrical spacing and sealing rings, one on each side of said rolling elements, each of said rings having a plurality of uniformly-circumferentially spaced recesses in which portions of said rolling elements are received, there being a number of recesses in each of said rings equal to the number of rolling elements, each of said rings having a first annular sealing lip contacting the arcuate outer surface of said inner race outside of said outwardly-facing groove, each of said rings having a second annular sealing lip contacting the inner surface of said outer race outside of said inwardly-facing groove, each of said rings having projecting means extending away from said outwardly-facing groove of said inner race, means engaged by said projecting means to hold said rings in place with respect to said rolling elements, said inner race, and said outer race, and resilient means extending around and supporting said outer race.

4. A support according to claim 3 characterized by said projecting means being annular ridges extending outwardly at least to corresponding edges of said inner race.

5. A support according to claim 3 characterized by there being from three to six of said rolling elements and each of said rings having from three to six of said recesses.

6. A support according to claim 3 characterized by there being a maximum of four of said rolling elements and each of said rings having a maximum of four of said recesses.

7. A support according to claim 3 characterized by each of said recesses receiving substantially one-half of the corresponding rolling element.

8. A support according to claim 3 characterized by said last-named means being flingers positioned adjacent annular edges of said inner race.

9. A support according to claim 8 characterized by each of said flingers having an inner mounting flange positioned adjacent one of the annular edges of said inner race, with said projecting means engaging the mounting flanges of said flingers.

10. A shaft support for rotatably supporting a portion of a drive shaft, said shaft support comprising rolling contact support means having an inner race to be mounted on the shaft, said race having an outwardly-facing annular groove at an intermediate portion of an outer surface thereof, an outer race having an inwardly-facing annular groove at an intermediate portion of an inner surface thereof, a plurality of rolling elements extending into said grooves, two spacing and sealing rings, one on each side of said rolling elements, each of said rings having a plurality of uniformly-circumferentially spaced recesses in which portions of said rolling elements are received, there being a number of recesses in each of said rings equal to the number of said rolling elements, each of said rings having a first annular sealing lip contacting the outer surface of said inner race outside of said outwardly-facing groove, each of said rings having a second annular sealing lip contacting the inner surface of said outer race outside of said inwardly-facing groove, each of said rings having projecting means extending away from said outwardly-facing groove of said inner race, a resilient cushion member extending around and supporting said outer race, two flingers, one located on each side of said inner race, said projecting means of said rings contacting said flingers to hold said rings in place with respect to said rolling elements, said inner race, and said outer race.

11. A support according to claim 10 characterized by said projecting means being annular ridges extending outwardly at least to corresponding edges of said inner race.

12. A support according to claim 10 characterized by there being from three to six of said rolling elements and each of said rings having from three to six of said recesses.

13. A support according to claim 10 characterized by there being a maximum of four of said rolling elements and each of said rings having a maximum of four of said recesses.

14. A support according to claim 10 characterized by each of said recesses receiving substantially one-half of the corresponding rolling element.

15. A support according to claim 10 charaterized by said flingers having inner mounting flanges positioned adjacent annular edges of said inner race, with said projecting means engaging the mounting flanges of said flingers.

16. In combination, a shaft of a drive line of a vehicle, a shaft support for said shaft, said support comprising rolling contact support means comprising an inner race affixed to said shaft and having an outwardly-facing annular groove, an outer race having an inwardly-facing annular groove, a plurality of rolling elements extending into said grooves, two spacing and sealing rings, one on each side of said rolling elements, each of said rings having a plurality of uniformly-circumferentially spaced recesses in which portions of said rolling elements are received, there being a number of recesses in each of said rings equal to the number of said rolling elements, each of said rings having a first sealing lip contacting said inner race, each of said rings having a second sealing lip contacting said outer race, said lips forming a lubricant seal for said rolling elements, each of said rings having an annular ridge extending away from said outwardly-facing groove of said inner race, a resilient cushion member extending around and supporting said outer race, two flingers, one located on each side of said inner race, each of said flingers having a mounting flange with a circular inner edge of a diameter substantially equal to an inner diameter of said inner race, said ridges of said rings contacting said mounting flanges of said flingers to hold said rings in place with respect to said rolling elements, said inner race, and said outer race.

17. The combination according to claim 16 characterized by said rings being made of a somewhat resilient plastic material.

18. The combination according to claim 16 characterized by each of said rings having an additional sealing lip contacting said inner race.

19. The combination according to claim 16 characterized by there being a maximum of four of said rolling elements and each of said rings having a maximum of four of said recesses.

20. The combination according to claim 16 characterized by each of said recesses receiving substantially one-half of the corresponding rolling element.

21. A low-cost, simplified rolling contact for use with a shaft support for supporting a portion fo a shaft, said rolling contact support having an inner race to be mounted on the shaft, said race having an outwardly-facing annular groove at an intermediate portion of an outer surface thereof, an outer race having an inwardly-facing annular groove at an intermediate portion of an inner surface thereof, a plurality of rolling elements extending into said grooves, a combination cage and lubricant sealing element comprising two symmetrical spacing and sealing rings, one on each side of said rolling elements, each of said rings having a plurality of uniformly-circumferentially spaced recesses in which portions of said rolling elements are received, there being a number of recesses in each of said rings equal to the number of said rolling elements, each of said rings having a first annular sealing lip contacting the outer surface of said inner race outside of said outwardly-facing groove, each of said rings having a second annular sealing lip contacting the inner surface of said outer race outside of said inwardly-facing groove, each of said rings having an additional annular sealing lip contacting the outer surface of said inner race outside of said first annular sealing lip, and resilient means extending around and supporting said outer race.

22. A low-cost, simplified rolling contact support for use with a shaft support for supporting a portion of a shaft, said rolling contact support having an inner race to be mounted on the shaft, said race having an outwardly-facing annular groove at an intermediate portion of an outer surface thereof, an outer race having an inwardly-facing annular groove at an intermediate portion of an inner surface thereof, a plurality of rolling elements extending into said grooves, a combination cage and lubricant sealing element comprising two symmetrical spacing and sealing rings, one on each side of said rolling elements, each of said rings having a plurality of uniformly-circumferentially spaced recesses in which portions of said rolling elements are received, there being a number of recesses in each of said rings equal to the number of said rolling elements, each of said rings having a first annular sealing lip contacting the outer surface of said inner race outside of said outwardly-facing groove, each of said rings having a second annular sealing lip contacting the inner surface of said outer race outside of said inwardly-facing groove, each of said rings having projecting means extending away from said outwardly-facing groove of said inner race, means engaged by said projecting means to hold said rings in place with respect to said rolling elements, said inner race, and said outer race, and resilient means extending around and supporting said outer race.

23. A low-cost, simplified rolling contact support for use with a shaft support for supporting a portion of a shaft, said rolling contact support having an inner race to be mounted on the shaft, said race having an outwardly-facing annular groove at an intermediate portion of an outer surface thereof, an outer race having an inwardly-facing annular groove at an intermediate portion of an inner surface thereof, a plurality of rolling elements extending into said grooves, there being at least three and not more than four of said rolling elements, recess means on each side of said rolling elements forming a plurality of uniformly-circumferentially spaced recesses in which portions of said rolling elements are received, there being at least three and not more than four of said recesses, equal in number to the number of said rolling elements, and lip means on each side of said rolling elements forming an annular sealing lip slidably contacting the outer surface of said inner race outside of said outwardly-facing groove, said recess means and said lip means part of sealing rings on each side of said rolling elements, said rings having projecting means extending away from said outwardly-facing groove of said inner race, and means engaged by said projecting means to hold said rings in place with respect to said rolling elements, said inner race, and said outer race.

24. A rolling contact support according to claim 23 characterized further by each of said rings having additional annular lip means contacting the inner surface of said outer race outside of said inwardly-facing groove.

25. A rolling contact support according to claim 23 characterized further by resilient means extending around and supporting said outer race.

* * * * *

UNITED STATES PATENT AND TRADEMARK OFFICE
CERTIFICATE OF CORRECTION

PATENT NO. : 4,960,334

DATED : October 2, 1990

INVENTOR(S) : Philip J. Mazziotti

It is certified that error appears in the above-identified patent and that said Letters Patent is hereby corrected as shown below:

Abstract, line 1, change "rotatbly" to --rotatably--.

Abstract, line 18, after "have" insert --an--.

Column 1, line 23, change "powered" to --powdered--.

Column 1, line 42, change "rolline" to --rolling--.

Column 1, line 53, change "prinicpal" to --principal--.

Column 1, line 68, change "desctiption" to --description--.

Column 2, line 55, change "uniformaly" to --uniformly--.

Column 4, line 1, change "fingers" to --flingers--.

Column 4, line 47, claim 1, line 6, after "being" insert --of--.

Column 5, line 5, claim 3, line 2, change "suppot" to --support--.

UNITED STATES PATENT AND TRADEMARK OFFICE
CERTIFICATE OF CORRECTION

PATENT NO. : 4,960,334

DATED : October 2, 1990

INVENTOR(S) : Philip J. Mazziotti

It is certified that error appears in the above-identified patent and that said Letters Patent is hereby corrected as shown below:

Column 8, line 32, claim 23, line 20, after "means" (second occurrence) insert --being--.

Signed and Sealed this

Fourth Day of February, 1992

Attest:

*Attesting Officer*

HARRY F. MANBECK, JR.

*Commissioner of Patents and Trademarks*